(12) United States Patent
Kynast et al.

(10) Patent No.: US 7,155,337 B2
(45) Date of Patent: Dec. 26, 2006

(54) METHOD FOR TRANSFERRING DESTINATION GUIDANCE ELEMENTS, VEHICLE NAVIGATION DEVICE AND CONTROL CENTER

(75) Inventors: Andreas Kynast, Hildesheim (DE); Arne Friedrichs, Brauschweig (DE); Volker Skwarek, Bad Salzdetfurth (DE)

(73) Assignee: Robert Bosch GmbH, Stuttgart (DE)

( * ) Notice: Subject to any disclaimer, the term of this patent is extended or adjusted under 35 U.S.C. 154(b) by 271 days.

(21) Appl. No.: 10/467,648

(22) PCT Filed: Jan. 17, 2002

(86) PCT No.: PCT/DE02/00133

§ 371 (c)(1),
(2), (4) Date: Jan. 14, 2004

(87) PCT Pub. No.: WO02/065058

PCT Pub. Date: Aug. 22, 2002

(65) Prior Publication Data

US 2004/0107045 A1   Jun. 3, 2004

(30) Foreign Application Priority Data

Feb. 9, 2001   (DE) ................................ 101 05 898

(51) Int. Cl.
*G01C 21/26* (2006.01)
*G01S 5/08* (2006.01)

(52) U.S. Cl. .................. 701/202; 701/200; 701/24; 340/995.19

(58) Field of Classification Search ........ 701/200–202, 701/23, 25, 209, 24; 340/995.19, 995.1
See application file for complete search history.

(56) References Cited

U.S. PATENT DOCUMENTS 5,459,469 A * 10/1995 Schuchman et al. .......... 342/37

FOREIGN PATENT DOCUMENTS

DE   196 51 146   6/1998

* cited by examiner

*Primary Examiner*—Y. Beaulieu
(74) *Attorney, Agent, or Firm*—Kenyon & Kenyon LLP (57) ABSTRACT

A method for transferring at least one navigation element from a vehicle navigation unit to a master station. The vehicle navigation unit does not include a database sufficient for a route calculation, including an input device via which a user is able to input navigation element data concerning at least one navigation element, the vehicle navigation unit including communications devices, or cooperating with separate communications devices, to exchange data with a master station in which routes are calculated. The vehicle navigation unit includes an arrangement to select at least one navigation element database entry, of a plurality of navigation element database entries, which are transmitted by the master station as response to the navigation element data transmitted to the master station, when the master station is not able uniquely to assign a plurality of navigation element database entries to at least one navigation element.

14 Claims, 3 Drawing Sheets

METHOD FOR TRANSFERRING DESTINATION GUIDANCE ELEMENTS, VEHICLE NAVIGATION DEVICE AND CONTROL CENTER

FIELD OF THE INVENTION

The present invention relates to a method for transferring at least one navigation element, especially a road (street) name and/or place name, from a vehicle navigation unit to a master station, including the following steps:
a) inputting navigation element data which relate to at least one navigation element, into the vehicle navigation unit,
b) transmitting input navigation element data to a master station via an online connection between the vehicle navigation unit and the master station.

The present invention also relates to a vehicle navigation unit, especially for participating in the method according to the present invention, which does not include a database sufficient for a route calculation, including an input device via which a user is able to input navigation element data concerning at least one navigation element, the vehicle navigation unit including communications devices, or cooperating with separate communications devices, to exchange data with a master station in which the routes are calculated. The present invention also relates to a master station, especially for participating in a method according to the present invention, in which navigation element database entries are available, the master station including communications devices or cooperating with separate communications devices to exchange data with vehicle navigation units.

BACKGROUND INFORMATION

To search for routes, one looks for a connection between a start and a destination according to certain criteria. For this purpose, the input of navigation elements is required which, for example, specify the start and/or the destination. Such a input may, for example, be made via a keyboard dedicated to the vehicle navigation unit. If the vehicle navigation unit carries a navigation element database with it, the navigation element data that are input may be directly verified by comparing them with the entries in the navigation element database. However, new types of vehicle navigation units which, for instance, are denoted as hybrid vehicle navigation units or as offboard vehicle navigation units, do not provide complete navigation element databases within the navigation unit. In some systems, even the process of the route search is separated from the vehicle navigation unit. In this context, during the start and/or destination input, no complete information is available to the user concerning possible navigation elements such as roads and places. Therefore, in the case of such vehicle navigation units an online connection to a central navigation element database is set up for the purpose of the start and/or destination transmission. In this connection, the problem arises that, for example, a deviation between the spelling of the navigation element input by the user and the navigation element database entries leads to, for instance, the starting point and/or the destination point not being able to be verified or transferred, so that no navigation is able to be performed.

SUMMARY OF THE INVENTION

The method according to the present invention includes the following steps:
a) inputting navigation element data which relate to at least one navigation element, into the vehicle navigation unit,
b) transmitting input navigation element data to a master station via online connection between the vehicle navigation unit and the master station,
c) comparing the transmitted navigation element data to navigation element database entries available in the master station, and differentiating between at least the following cases:
  Case 1: a navigation element database entry may be uniquely assigned to the transmitted navigation element data, with respect to each navigation element that is included,
  Case 2: a plurality of navigation element database entries is not able to be uniquely assigned to the transmitted navigation element data, at least with respect to one navigation element,
  Case 3: no navigation element database entry is able to be assigned to the transmitted navigation element data, at least with respect to one navigation element, in case 2, the master station transmitting at least some of the plurality of the navigation element database entries, that are not uniquely assignable, via an online connection to the vehicle navigation unit, a multiple-step communications method is made available using which, for example, starting points and/or destination points are able to be verified even when the user, if a keyboard input is provided, does not know the exact spelling of the navigation elements or enters them in an abbreviated form. Corresponding problems may arise in the case of voice input, that is also possible according to the basic idea of the present invention.

The method according to the present invention may provided that, in case 2, (i.e. if a plurality of navigation element database entries is not able to be uniquely assigned to the transmitted navigation element data, at least with respect to one navigation element) the plurality of the not uniquely assignable navigation element database entries transmitted to the vehicle navigation unit is offered by the vehicle navigation unit to a user for selection, and that a navigation element database entry selected by the user is transmitted by the vehicle navigation unit to the master station via an online connection. The plurality of the not uniquely assignable navigation element database entries, may for this purpose, for example, be shown on a display of the vehicle navigation unit, the user may be allowed to select the applicable navigation element database entry or the applicable navigation element database entries. In general, however, the method is not limited to the extent that the inputs into the vehicle navigation unit are made via a keyboard, but inputs such as a touch screen input or a voice input may also be provided.

The method according to the present invention may also provides that in case 2 (i.e. if a plurality of navigation element database entries is not able to be uniquely assigned to the transmitted navigation element data, at least with respect to a navigation element) an additional selection point is offered to the user, which may be selected if none of the plurality of the transmitted navigation element database entries, that are not uniquely assignable, is applicable. Depending on whether the navigation element data input by the user and transmitted to the master station relate to one or more navigation elements, several further such selection points may also be provided, in such a manner that a further selection point is provided for each navigation element.

In this connection, the method according to the present invention may also provides that the selection of the additional selection point (or of the additional selection points) undertaken by the user is communicated to the master station via an online connection, and that the master station subsequently acts according to case 3 (i.e. the case in which no navigation element database entry is able to be assigned to the transmitted navigation element data, at least with respect to one navigation element.

The method according to the present invention may provided that in case 1 (i.e. if a navigation element database entry may be uniquely assigned to the transmitted navigation element data, with respect to each navigation element that is included) each uniquely assignable navigation element database entry is entered into file by the master station for further processing. In this context, this further processing may especially include the route calculation and the transmission to the vehicle. However, exemplary embodiments may also be provided in which the further processing includes the transmission of the verified navigation elements to another master station or back to the vehicle navigation unit, provided that the route calculation is performed there.

The method according to the present invention may further provides that the master station in case 3 (i.e. no navigation element database entry is able to be assigned to the transmitted navigation element data, at least with respect to one navigation element) transmits a message via an online connection to the vehicle navigation unit which signals to the user that, to at least one navigation element, no navigation element database entry is able to be assigned. In this case, the user may enter anew navigation element data which specifically relate to the problematic navigation element. In this context, the user may, for instance, pick another spelling or, in case the first entry was made in the form of an abbreviation, enter the complete designation, such as of the place or the road.

In this connection it may be further provided in the method according to the present invention that it is offered to the user in case 3 (i.e. no navigation element database entry is able to be assigned to the transmitted navigation element data, at least with respect to one navigation element) that an online connection to an operator is set up. This online connection may especially be a telephone connection, which may allow for the user to try, in common with the operator, to verify the questionable navigation element. A navigation element verified in this manner may then be input in a suitable manner into the master station by the operator, so that it is available for further processing.

As was mentioned before, it may be provided in the method according to the present invention that at least one navigation element includes a place name, e.g., the name of the starting location and/or the name of the destination location.

As was mentioned before, it may be provided in the method according to the present invention that at least one navigation element includes a place name, e.g., the name of the starting location and/or the name of the destination location.

The method according to the present invention may be performed in that the input navigation data relate to several navigation elements of a route starting point and/or a route destination point. For example, the user may enter the name of the starting location, the name of the starting roads, the section of the starting road, the name of the destination location, the name of the destination road, the section of the destination road, and so forth, into the vehicle navigation unit altogether as navigation element data, using the supposed or abbreviated spelling, so that all the data may be transmitted at once to the master station. Using this procedure lowers the number of communications steps, between the vehicle navigation unit and the master station, that is necessary in order to verify all the required navigation elements.

In addition or alternatively it may be provided in the method according to the present invention that it be performed several times in a row, for different navigation elements. For example, first of all, only the name of the starting location may be transferred and verified, and all further navigation elements required for route planning may be processed, one after another. In this exemplary embodiment of the method according to the present invention it is true that more communications steps are required, but further navigation element data have to be input only if all previously processed navigation elements have been successfully verified and transferred.

As was mentioned before, the method according to the present invention may provide that it is used for the transfer of one or more of the following navigation elements: Starting location, starting road, section of the starting road, destination location, destination road, section of the destination road. In this context, a road section may be verified, for example, by a road crossing, a kilometer reading or a house number, and so forth.

In the method according to the present invention may provide that the data exchange between the vehicle navigation unit and the master station occurs over a mobile radio network. Such a mobile radio network may operate, for example, according to the GSM (Global System for Mobile Communications) or the UMTS (Universal Mobile Telecommunications Service) standard. In this connection it may be provided that mobile radio terminals that are present anyway in the vehicle be used for the data exchange. However, it may be provided that special communications devices are allocated to the vehicle navigation unit which operate, for instance, according to a special standard which is used for the data exchange between vehicle navigation units and one or more master stations.

Each vehicle navigation unit configured for participation in the method according to the present invention comes under the range of protection of the appertaining claims.

The same thing applies for each master station, which may be formed, for example, by a communications server, that is configured for participation in the method according to the present invention.

The vehicle navigation unit, according to the present invention, includes an arrangement of selection via which the user may select at least one navigation element database entry of a plurality of navigation element database entries, which is transmitted from the master station as a reply to navigation element data transmitted to the master station if the master station is not able to allocate a plurality of navigation element database entries uniquely to at least one navigation element, navigation elements may also be verified if the user does not know the exact spelling of the navigation element, or if he has entered the navigation element as an abbreviation. In the case of voice input, e.g., the navigation elements required for route planning may be verified even if the user abbreviates the designation of the navigation element or pronounces it in a wrong or unclear manner. In this context, the arrangement of selection may be formed, for example, by a keyboard or a touch-screen display, the plurality of the navigation element database entries in the latter case being shown on the touch-screen display. If necessary, the selection of the appropriate navigation element database entry may also be made by a voice input, in which case it may be provided that a number is assigned to each navigation element database entry of the plurality of navigation element database entries, which the user pronounces to make his selection.

In one vehicle navigation unit according to the present invention, it may be further provided that it transmits the at least one navigation element database entry, selected by the user, to the master station, using the communications devices. If the vehicle navigation unit is used to perform the method according to the present invention, for example, the master station may provide, in this case, a suitable further processing of the selected navigation element database entry.

Also for the vehicle navigation unit, it may be provided that at least one navigation element includes a place name, e.g., the name of the starting location and/or the name of the destination location.

Correspondingly, it may be provided in the vehicle navigation unit according to the present invention that at least one navigation element includes a place name, e.g., the name of the starting road and/or the name of the destination road.

In the vehicle navigation unit according to the present invention it may be provided that the input navigation element data relate to several navigation elements of a route starting point and/or a route destination point. If several navigation elements are entered at the same time, the number of transactions may be reduced, for example, with which the method according to the present invention is performed, until all necessary navigation elements have been verified.

Even for the vehicle navigation unit according to the present invention it may be provided that the communications devices are constituted by a mobile radio terminal. This mobile radio terminal may operate, for example, according to the GSM or the UMTS standard. For example, when the communications devices are constituted by separate communications devices, it may be provided that mobile radio terminals that are present anyway in the vehicle are used for the data exchange. However, it may also be provided that a special mobile radio terminal is assigned to the vehicle navigation unit or is integrated into it.

It is may be provided for the master station, according to the present invention, to be configured to receive transmitted navigation element data via communications devices from a vehicle navigation unit, and because it includes an arrangement for comparing received navigation element data to navigation element database entries, and thereby distinguishing at least the following cases:

Case 1: a navigation element database entry may be uniquely assigned to the transmitted navigation element data, with respect to each navigation element that is included, Case 2: a plurality of navigation element database entries is not able to be uniquely assigned to the transmitted navigation element data, at least with respect to one navigation element, Case 3: no navigation element database entry is able to be assigned to the transmitted navigation element data, at least with respect to one navigation element, and because in Case 2 they transmit at least some of the plurality of the navigation element database entries, that are not uniquely assignable, via communications devices to the vehicle navigation unit, e.g., vehicle navigation units which include no, or include no complete navigation element database, may be supported in the verification of navigation elements. Thereby the user of an appropriate vehicle navigation unit may input navigation elements in the supposed form and/or in an abbreviated form. In this context, the master station is formed by suitable hardware and software, one skilled in the art being able to build the appropriate software, which, for example, may be suitable for performing the method according to the present invention, using means known to him. The master station may be formed, for example, by a communications server, or configured together with it.

The master station may be configured to receive navigation element database entries selected by a user from the plurality of the navigation element database entries via communications devices, and to process further these navigation element database entries selected by the user. This further processing may include the calculation of a route or rather, the navigation. However, it may also be provided that the verified navigation elements are transmitted to another master station or to a vehicle navigation unit, insofar as in those locations an appropriate further processing is provided.

The master station may be configured in Case 1 (i.e. if a navigation element database entry may be uniquely assigned to the transmitted navigation element data, with respect to each navigation element that is included) to further process the uniquely assignable navigation element database entries, reference being made to the above comments.

Furthermore, the master station according to the present invention may be configured in case 3 (i.e. no navigation element database entry is able to be assigned to the transmitted navigation element data, at least with respect to one navigation element) to transmit a message via the communications devices to the vehicle navigation unit which signals to the user that, to at least one navigation element, no navigation element database entry is able to be assigned. At the vehicle navigation unit end, the user may then be allowed to enter navigation element data anew. For example, a user may try in such a case to input a navigation element first entered in abbreviated form, in fully written out form on his the second try.

The master station according to the present invention may be further configured in case 3 (i.e. no navigation element database entry is able to be assigned to the transmitted navigation element data, at least with respect to one navigation element) to transmit a message via the communications devices to the vehicle navigation unit which offers to the user that an online connection to an operator will be established. In this case too, the online connection may especially be a telephone connection, which makes it possible for the user to try, in common with the operator, to verify the questionable navigation element. A navigation element verified in this manner may then be entered in the master station by the operator in a suitable form for further processing.

Also in connection with the master station according to the present invention, it may be provided that at least one navigation element includes a place name, for example, the name of the starting location and/or the name of destination location.

Furthermore, it may be provided for the master station according to the present invention that at least one navigation element includes a road name, for example, the name of the starting road and/or the name of the destination road.

The master station according to the present invention may be configured in such a manner that the input navigation data may relate to several navigation elements of a route starting point and/or of a route destination point. If the navigation element data transmitted to the master station relate to several or all the navigation elements required for the route calculation and navigation, in many cases a lower number of communications steps is required for verifying all required navigation elements.

It is also provided in connection with the master station according to the present invention that the communications devices are configured to communicate with mobile radio terminals. In this case, too, it may be provided that the mobile radio terminal(s) operate according to the GSM standard or the UMTS standard, other suitable standards naturally being able to be used, for instance, standards especially provided for the communication between vehicle navigation units and master stations.

DETAILED DESCRIPTION

Figure 1:
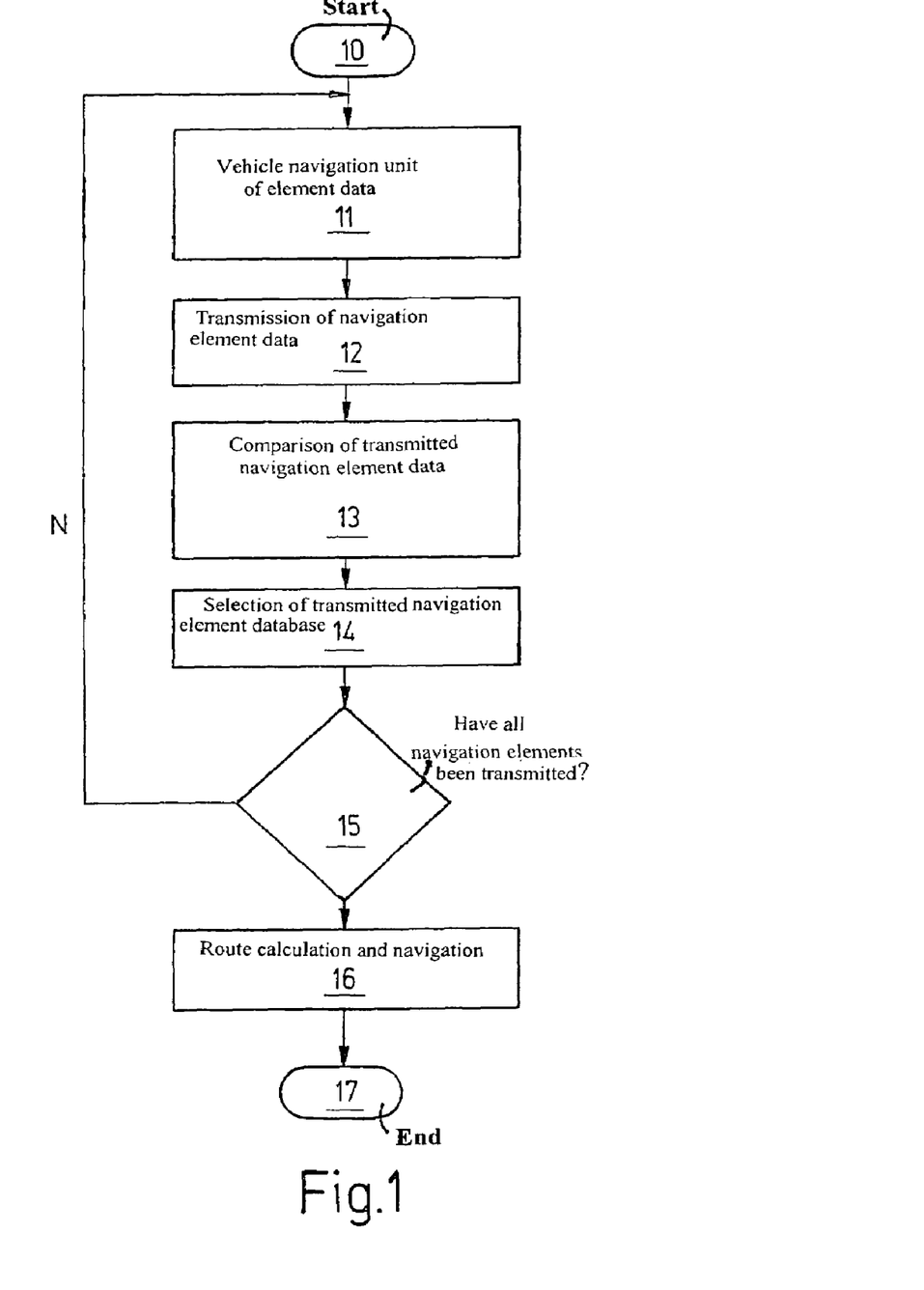
FIG. 1 shows a flow chart which illustrates a first exemplary embodiment of the method according to the present invention, in which the navigation element data relate to only one navigation element.

FIG. 1 shows a flow chart which illustrates a first exemplary embodiment of the method according to the present invention, in which the navigation element data relate to only one navigation element, the function of the blocks shown in FIG. 1 being revealed by the following Table 1.

TABLE 1

| Block | Function |
|---|---|
| 10 | start |
| 11 | input into the vehicle navigation unit of navigation element data which relate to a navigation element, in the supposed and/or possibly also abbreviated spelling |
| 12 | transmission of the input navigation element data to a master station via an online connection between the vehicle navigation unit and the master station |
| 13 | comparison of the transmitted navigation element data with the navigation element database entries available in the master station (in this example, with the result that a plurality of navigation element database entries may not be uniquely assigned to the transmitted navigation element data for the navigation element) and transmission of the most probable, not uniquely assignable navigation element database entries to the vehicle navigation unit via an online connection |
| 14 | Selection of the desired navigation element database entry from the plurality of the navigation element database entries transmitted to the vehicle navigation unit, that were not uniquely assignable, by the user, and transmission of the navigation element database entry selected by the user from the vehicle navigation unit to the master station, via an online connection |
| 15 | have all navigation elements been transmitted? |
| 16 | route calculation and navigation |
| 17 | end |

The first exemplary embodiment of the method according to the present invention begins in block 10. In block 11, the user enters navigation element data, which relate to a navigation element, into the vehicle navigation unit. In the exemplary embodiment shown, the entering is done on a keyboard, the respective navigation element, such as the starting location, being entered in the supposed and/or possibly also abbreviated spelling. In block 12 the navigation element data entered in block 11 are transmitted to a master station, to be specific, via an online connection between the vehicle navigation unit and the master station. This online connection may be formed, for example, by a mobile radio connection.

In block 13, the master station compares the transmitted navigation element data with the navigation element database entries available in the master station. In the example shown, it is assumed that this comparison leads to the result that a plurality of navigation element database entries may not be uniquely assigned to the transmitted navigation element data for the navigation element, which corresponds to case 2. Therefore the master station transmits a plurality of not uniquely assignable navigation element database entries via an online connection to the vehicle navigation unit, with respect to the transmitted navigation element database entries, the most probable navigation element database entries being involved. In block 14, the selection is made by the user of the desired navigation element database entry from the plurality of navigation element database entries that are not uniquely assignable transmitted to the vehicle navigation unit. For this purpose, the navigation element database entries transmitted by the master station are indicated, for example, on a display of the vehicle navigation unit, the user may be allowed, for example, select an "indicated entry" by a corresponding touching of the display or making a keyboard entry. After the user has selected the desired navigation element database entry, this selected navigation element database entry is transmitted by the vehicle navigation unit to the master station, specifically via an online connection. In block 15 it is checked whether all navigation elements required for a route calculation have already been transferred and verified. If this is not the case, the program returns to block 11, and the user may enter anew the navigation element data. If in block 15 it is determined that all the required navigation elements have already been verified, in block 16 the route calculation and the navigation are performed. In block 17, the method according to the first exemplary embodiment is ended.

In practice, the method according to the present invention could, for example, proceed as follows: The user of a vehicle navigation unit of the type Offboard Navigation would like to be guided from Hildesheim, Robert Bosch Street, to the Munich airport. The user enters into his vehicle navigation unit as the first navigation element the starting location as "HILDE". The corresponding navigation element data are transmitted to the master station and they are there compared with navigation element database entries. As a result, he gets back the following entries: HILDEN, HILDERS and HILDESHEIM. The user selects the navigation element database entry HILDESHEIM and additionally sends as second navigation element the starting street "ROBERT-BOSCH". Thereupon the user receives back from the master station the entries ROBERTBOSCHWORKS and ROBERT-BOSCHSTREET. The user selects the second entry and transmits it to the master station. The user proceeds similarly for the destination. After all the navigation elements required for the route calculation have been verified, the route calculation may be started.

Figure 2:
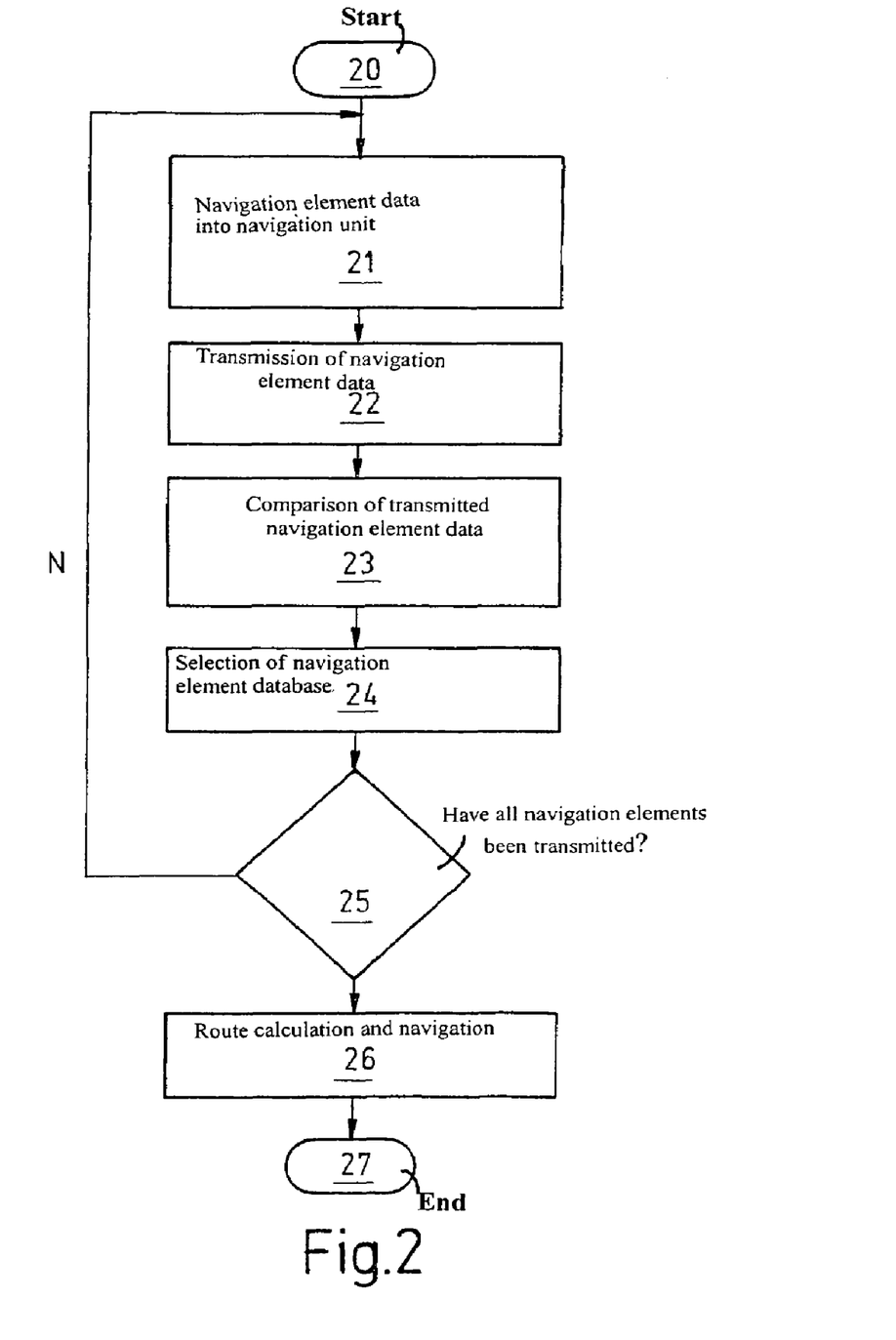
FIG. 2 shows a flow chart which illustrates a second exemplary embodiment of the method according to the present invention, in which the navigation element data relate to several navigation elements.

FIG. 2 shows a flow chart which illustrates a second exemplary embodiment of the method according to the present invention, in which the navigation element data relate to several navigation elements, the function of the blocks shown in FIG. 2 being revealed by the following Table 2.

TABLE 2

| Block | Function |
|---|---|
| 20 | start |
| 21 | input of navigation element data which relate to several navigation elements into the vehicle navigation unit, in the supposed spelling and/or possibly also in abbreviated spelling |
| 22 | transmission of the input navigation element data to a master station via an online connection between the vehicle navigation unit and the master station |
| 23 | comparison of the transmitted navigation element data with the navigation element database entries available in the master station (in this example, with the result that a plurality of navigation element database entries may not be uniquely assigned to the transmitted navigation element data at least for some navigation elements) and transmission of the most probable, not uniquely assignable navigation element database entries to the vehicle navigation unit via an online connection |
| 24 | selection of the desired navigation element database entry from the plurality of the navigation element database entries transmitted to the vehicle navigation unit, that were not uniquely assignable, by the user, and transmission of the navigation element database entries selected by the user from the vehicle navigation unit to the master station, via an online connection |
| 25 | have all navigation elements been transmitted? |
| 26 | route calculation and navigation |
| 27 | end |

After the beginning of the method in block 20, in block 21 the user enters navigation element data into the navigation unit, the navigation element data relating to several navigation elements, such as all navigation elements which are required for a route calculation (such as starting location, starting road, destination location and destination road). Entering is done also in this case in the supposed spelling and/or an abbreviated spelling. In block 22, the navigation elements that were entered are transmitted to the master station. In block 23, the master station compares the transmitted navigation element data with navigation element database entries available in the master station, and specifically in such a manner that a corresponding comparison is performed for each navigation element. In the case presented, the comparison may have the result that the master station is able to uniquely assign a navigation element database entry to some navigation elements, whereas for other navigation elements in each case a plurality of navigation element database entries are ascertained which are not uniquely assignable. Then, for each not yet verified navigation element a plurality of ascertained navigation element database entries is transmitted to the vehicle navigation unit. In block 24 the user may select the applicable navigation elements correspondingly. Provided it is determined in block 25 that not yet all navigation elements have been transmitted and verified, the system branches to block 21, so that the user is given the chance of entering further navigation element data with respect to not yet verified navigation elements. If in block 25 it is determined that all the navigation elements have been transmitted and verified, the system proceeds to block 26, in which the route calculation and the navigation are performed. In block 27, the method according to the second exemplary embodiment of the present invention is ended.

In practice, the second exemplary embodiment of the method according to the present invention may proceed, for example, as follows: The user of a vehicle navigation unit of the type Offboard Navigation would like to be guided from Hildesheim, Robert Bosch Street, to the Munich airport. In this exemplary embodiment, the user enters for a first navigation element the place designation "HILDE". Furthermore, the user enters, with respect to a second navigation element, "ROBERTBOSCH" as the street designation. After the corresponding navigation element data have been transmitted to the master station, the user receives for the first navigation element the navigation element database entries HILDEN, HILDERS and HILDESHEIM. With respect to the second navigation element, the user receives back almost simultaneously the navigation element database entries ROBERTBOSCHWORKS and ROBERTBOSCHSTREET. The user then selects the navigation element database entry HILDESHEIM and the navigation element database entry ROBERTBOSCHSTREET. Thereupon the vehicle navigation unit transmits the information selected by the user to the master station. In a second step, the user may now enter all the navigation element data required to get to the destination. Naturally, it is also possible to make all the entries for all the navigation elements with respect to the starting point and the destination point at once and to transmit them.

Figure 3:
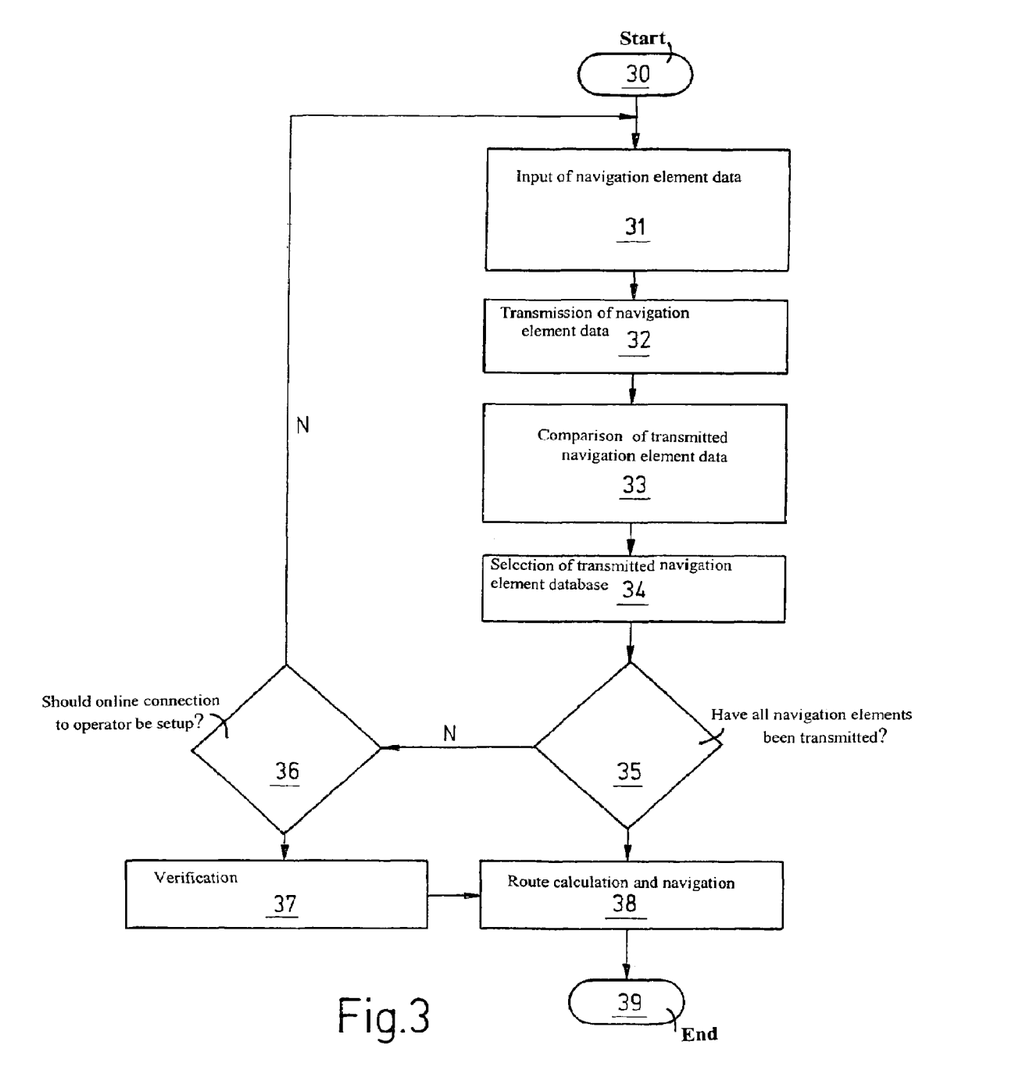
FIG. 3 shows a flow chart which illustrates a third exemplary embodiment of the method according to the present invention in which it is provided that the user is offered the support of an operator if at least one navigation element may not be verified.

FIG. 3 shows a flow chart which illustrates a third exemplary embodiment of the method according to the present invention, in which it is provided that the user is offered support by an operator if at least one navigation element may not be verified, the function of the blocks shown in FIG. 3 being revealed by the following Table 3.

TABLE 3

| Block | Function |
|---|---|
| 30 | start |
| 31 | input of navigation element data which relate to several navigation elements into the vehicle navigation unit, in the supposed spelling and/or possibly also in abbreviated spelling |
| 32 | transmission of the input navigation element data to a master station via an online connection between the vehicle navigation unit and the master station |
| 33 | comparison of the transmitted navigation element data with the navigation element database entries available in the master station (in this example, with the result that a plurality of navigation element database entries may not be uniquely assigned to the transmitted navigation element data at least for some navigation elements) and transmission of the most probable, not uniquely assignable navigation element database entries to |

TABLE 3-continued

| Block | Function |
|---|---|
| | the vehicle navigation unit via an online connection |
| 34 | selection of the desired navigation element database entries from the plurality of the navigation element database entries transmitted to the vehicle navigation unit, that were not uniquely assignable by the user, and transmission of the navigation element database entries selected by the user from the vehicle navigation unit to the master station, via an online connection |
| 35 | have all navigation elements been transmitted? |
| 36 | should an online connection to an operator be set up? |
| 37 | verification of a problematic navigation element by a conversation between user and operator |
| 38 | route calculation and navigation |
| 39 | end |

The sequence of the method according to the third exemplary embodiment, with respect to blocks 30 to 34, corresponds to the sequence of the method according to the second exemplary embodiment, as was described in the light of blocks 20 through 24. In addition, in the case of the third exemplary embodiment it is provided that, to the extent that it is determined in block 35 that not yet all navigation elements have been transmitted, or rather that to at least one navigation element no navigation element database entry could be assigned, the user may decide in block 36 whether an online connection to an operator is to be set up. Provide that such an online connection to an operator is not to be set up, the system branches to block 31, so that the user has the chance, at least with respect to the navigation element(s), to which no navigation element database entries could be assigned, of entering new navigation element data. Provided it is decided in block 36 that an online connection to an operator shall be set up, the system branches to block 37, in which at least one problematic navigation element may be verified by a conversation between the user and the operator. In this context, the operator enters the verified navigation element(s) in a suitable form, so that the system may branch to block 38, in which the route calculation and the navigation are performed. Provided it was determnined in block 35 that all navigation elements have been transmitted and verified, the system branches directly to block 38. The method according to the third exemplary embodiment of the present invention ends at block 39.

The preceding description of the exemplary embodiments according to the present invention serves only for illustrative purposes, and not for the purpose of limiting the invention. Various changes and modifications are possible within the framework of the present invention without going beyond the scope of the present invention or its equivalents. Within the framework of the present invention, various changes and modifications are possible, without leaving the scope of the present invention or its equivalents.

What is claimed is:

1. A method for transferring at least one navigation element from a vehicle navigation unit to a master station, the method comprising:

entering navigation element data which relate to at least one navigation element into the vehicle navigation unit, transmitting the navigation element data to the master station via an online connection between the vehicle navigation unit and the master station, comparing the navigation element data to navigation element database entries available in the master station; and differentiating between at least the following cases:
    Case 1: a navigation element database entry is uniquely assigned to the navigation element data, with respect to each navigation element that is included;
    Case 2: navigation element database entries is not uniquely assigned to the navigation element data, at least with respect to one navigation element;
    Case 3: the navigation element database entries are not assignable to the navigation element data, at least with respect to one navigation element;
    wherein in case 2, the master station transmitting at least some of the navigation element database entries, that are not uniquely assignable, via the online connection to the vehicle navigation unit, and an additional selection point is offered to the user in Case 2 which is selected by the user if none of navigation element database entries, that were transmitted and which are not uniquely assignable, is applicable.

2. The method as recited in claim 1, wherein the at least one navigation element includes at least one of a road name and a place name.

3. The method of claims 1, wherein the navigation element database entries that are not uniquely assignable, which are transmitted to the vehicle navigation unit in case 2, are offered to the user, by the vehicle navigation unit, for selection, and a navigation element database entry selected by the user is transmitted to the master station by the vehicle navigation unit via the online connection.

4. The method of claim 1, wherein, a selection undertaken by the user of the addition point is communicated to the master station via the online connection, and the master station subsequently according to Case 3.

5. The method of claim 1, wherein in Case 1, each uniquely assignable navigation element data base entry is entered into a file by the master station for further processing.

6. The method of claim 1, wherein, in Case 3, the master station transmits a massage to the vehicle navigation unit via the online connection, so as to signal to the user that no navigation database entry is assignable to at least one of the navigation elements.

7. The method of claim 1, wherein the user, in Case 3, is offered a set up with another online connection to an operator.

8. The method of claim 1, wherein the at least one navigation element includes a place name.

9. The method of claim 1, wherein the at least one navigation element includes a road name.

10. The method of claim 1, wherein entered navigation data concern navigation elements of at least one of a route starting and a route destination point.

11. The method of claim 1, wherein the method is executed sequentially for different navigation elements.

12. The method of claim 1, wherein the method is used to transfer at least one the following navigation elements: a starting, a starting road, a section of the starting road, a destination location, a destination road, and a section of the destination road.

13. The method of claim 1, wherein data exchange between the vehicle navigation unit and the master station is executed via a mobile radio network.

14. A vehicle navigation system, comprising:

a vehicle navigation arrangement to perform the following:

entering navigation element data which relate to at least one navigation element into the vehicle navigation unit;

transmitting the navigation element data to a master station via an online connection between the vehicle navigation unit and the master station;

comparing the navigation element data to navigation element database entries available in the master station; and differentiation between at least the following cases:

Case 1: a navigation element database entry is uniquely assignable to the navigation element data, with respect to each of the at least one navigation element that is included;

Case 2: navigation element entries are not uniquely assignable to the navigation element data, at least with respect to one of the at least one navigation element;

Case 3: the navigation element database entries are not assignable to the navigation element data, at least with respect to one of the at least navigation element;

wherein in Case 2, the master station transmits at least some of the navigation element database entries, which are not uniquely assignable, via the online connection, and an additional selection point is offered to a user in Case 2 which is selected by the user when none of the navigation element database entries, which were transmitted and which are not uniquely assignable, is applicable.

* * * * *